(12) United States Patent
Katz et al.

(10) Patent No.: US 11,242,018 B2
(45) Date of Patent: Feb. 8, 2022

(54) SYSTEM AND METHOD FOR MULTIPLE AND DYNAMIC METEOROLOGICAL DATA SOURCES

(71) Applicant: RAIL VISION LTD, Ra'anana (IL)

(72) Inventors: Elen Josef Katz, Haruzim (IL); Shahar Hania, Kedumim (IL)

(73) Assignee: RAIL VISION LTD, Ra'anana (IL)

( * ) Notice: Subject to any disclaimer, the term of this patent is extended or adjusted under 35 U.S.C. 154(b) by 0 days.

(21) Appl. No.: 16/640,370

(22) PCT Filed: Aug. 20, 2018

(86) PCT No.: PCT/IL2018/050918
§ 371 (c)(1),
(2) Date: Feb. 20, 2020

(87) PCT Pub. No.: WO2019/038759
PCT Pub. Date: Feb. 28, 2019

(65) Prior Publication Data
US 2020/0172029 A1    Jun. 4, 2020

Related U.S. Application Data

(60) Provisional application No. 62/548,225, filed on Aug. 21, 2017.

(51) Int. Cl.
*G08G 1/09* (2006.01)
*B60R 16/023* (2006.01)
(Continued)

(52) U.S. Cl.
CPC ........ *B60R 16/0237* (2013.01); *G01S 13/951* (2013.01); *G01W 1/02* (2013.01);
(Continued)

(58) Field of Classification Search
CPC .... B60R 16/0237; H04W 4/38; H04W 4/029; H04W 4/021; G01S 13/951; G01W 1/02; G01W 2203/00
(Continued)

(56) References Cited

U.S. PATENT DOCUMENTS 8,190,118 B2 * 5/2012 Sennett ................. H04W 4/024
455/404.1
9,223,020 B1 * 12/2015 Crosmer ................. G01S 7/003
(Continued)

FOREIGN PATENT DOCUMENTS

| CN | 10348746 | 1/2014 |
|---|---|---|
| CN | 103487846 | 1/2014 |
| JP | 4385959 | 8/2006 |

OTHER PUBLICATIONS

International Search Report of Application No. PCT/IL2018/050918 dated Nov. 22, 2018.
(Continued)

*Primary Examiner* — Zhen Y Wu
(74) *Attorney, Agent, or Firm* — Pearl Cohen Zedek Latzer Baratz LLP (57) ABSTRACT

A system for collecting and distributing meteorological data is disclosed the system comprising at least two mobile meteorological stations (MMS) and each of the stations comprising at least a controller, a sensors unit that comprises one or more sensors such as temperature sensor, humidity sensor, air pressure sensor, wind speed and/or wind direction sensor, a location sensor unit and a communication unit configured to enable communication with at least one other MMS. The controller may be configured to receive meteorological data from the sensors unit and location data from the location sensor unit and to send a meteorological data and location data to the at least one other MMS.

18 Claims, 4 Drawing Sheets

(51) Int. Cl.
  *H04W 4/38* (2018.01)
  *H04W 4/029* (2018.01)
  *G01S 13/95* (2006.01)
  *G01W 1/02* (2006.01)
  *H04W 4/021* (2018.01)

(52) U.S. Cl.
  CPC ........... *H04W 4/021* (2013.01); *H04W 4/029* (2018.02); *H04W 4/38* (2018.02); *G01W 2203/00* (2013.01)

(58) Field of Classification Search
  USPC .......................................................... 340/905
  See application file for complete search history.

(56) References Cited

U.S. PATENT DOCUMENTS

| | | | | |
|---|---|---|---|---|
| 9,233,020 | B2* | 1/2016 | Matsumiya | A61F 5/451 |
| 9,967,707 | B2* | 5/2018 | Esposito | G01S 13/951 |
| 10,285,001 | B2* | 5/2019 | Allen | H04L 51/32 |
| 10,495,785 | B2* | 12/2019 | Leblanc | G01W 1/10 |
| 10,585,189 | B1* | 3/2020 | Dove | G01S 13/955 |
| 10,761,207 | B2* | 9/2020 | Wang | G08G 5/0091 |
| 2005/0187714 | A1 | 8/2005 | Brulle-Drews | |
| 2006/0015254 | A1* | 1/2006 | Smith | H04W 4/02 702/3 |
| 2006/0121893 | A1* | 6/2006 | Tillotson | G01P 5/001 455/431 |
| 2007/0069941 | A1 | 3/2007 | Pearlman et al. | |
| 2010/0004862 | A1* | 1/2010 | Gentles | G01W 1/06 702/3 |
| 2011/0320124 | A1* | 12/2011 | Al-Ruwais | G01N 21/538 702/2 |
| 2014/0327547 | A1* | 11/2014 | Johnson | G08B 21/18 340/601 |
| 2016/0057568 | A1* | 2/2016 | Root | G06F 16/29 455/456.3 |
| 2017/0023702 | A1* | 1/2017 | Smyth | G01W 1/02 |
| 2017/0090069 | A1 | 3/2017 | Kirby | |
| 2017/0247161 | A1* | 8/2017 | Balthes | G01N 15/08 |

OTHER PUBLICATIONS

European Search Report of Application No. 18848677.3 dated Dec. 23, 2020.

* cited by examiner

SYSTEM AND METHOD FOR MULTIPLE AND DYNAMIC METEOROLOGICAL DATA SOURCES

CROSS-REFERENCE TO RELATED APPLICATIONS

This application is a National Phase Application of PCT International Application No. PCT/IL2018/050918, International Filing Date Aug. 20, 2018, published as WO 2019/038759 on Feb. 28, 2019 and entitled System and Method for Multiple and Dynamic Meteorological Data Sources, claiming the benefit of U.S. Provisional Patent Application No. 62/548,225, filed Aug. 21, 2017 which is hereby incorporated by reference.

BACKGROUND OF THE INVENTION

Meteorological datum is typically collected, in some instances analyzed and transmitted for distribution by stationary meteorological stations, with some partial input collected typically by airplane pilots.

There is a need to for system and method capable of collecting meteorological data by movable collecting systems, thereby providing an updated and continuous meteorological data along the travel line of the movable system with relatively large covered area and/or long covered lines and with relatively frequent update for each such covered area and/or track.

SUMMARY

A system for collecting and distributing meteorological data is disclosed comprising at least two mobile meteorological stations (MMS), each comprising at least a controller, sensors unit, comprising one or more sensors from the list including temperature sensor, humidity sensor, air pressure sensor, wind speed and/or wind direction sensor, a location sensor unit and a communication unit configured to enable communication with at least one other MMS. The controller may be configured to receive meteorological data from the sensors unit and location data from the location sensor unit and to send a meteorological data and location data to the at least one other MMS.

According to embodiments of the invention the system may comprise a remote central service unit configured to receive store and process the meteorological data and to build dynamic and location-based meteorological data map for an area covered by the at least two MMS units.

In some embodiments the system may further comprise a long-range vision system (LRVS) unit, that may be configured to receive images of a scene in the vicinity of the MMS, and the controller may be configured to process the received images and to extract meteorological data from the images.

In some embodiments the controller may further be configured to send the meteorological data extracted from the received images to the at least one other MMS.

In some embodiments the LRVS may be operative in one or more of the following wavelength ranges comprising long wavelength infrared (LWIR) range, mid-wave IR (MWIR) range and visible light range.

A method for collecting, distributing and presenting meteorological data comprises providing at least two mobile meteorological stations (MMS), each comprising at least a controller, sensors unit, comprising one or more sensors from the list including temperature sensor, humidity sensor, air pressure sensor, wind speed and/or wind direction sensor, a location sensor unit and communication unit configured to enable communication with at least one other MMS. The method further comprises collecting meteorological data and location data from at least one of the at least two MMSs and sending the collected meteorological and location data and location data to the at least one other MMS.

In some embodiments the method comprises sending the collected meteorological and location data and location data of the at least two MMSs to a central service unit and building dynamic and location-based meteorological data map for an area covered by the at least two MMSs. In some embodiments the dynamic and location-based meteorological data map may indicate the gradient of at least one meteorological data item as it changes in time and position.

In some embodiments the method further comprises transmitting the dynamic and location-based meteorological data map to at least one of the at least two MMSs.

In some embodiments the method comprises receiving images from a long-range vision system (LRVS) unit of scene in the vicinity of the MMS.

In some embodiments the method further comprising processing images received from the LRVS and extracting meteorological data from the images.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Traveling vehicles, such as trains, trucks and the like may be equipped with movable weather station, adapted to measure, record and report plurality of meteorological parameters, such as temperature, humidity, dew point, air pressure, visibility, wind direction and strength, meteorological phenomena (such as rain, snow, hail, haze, visibility and the like). Some meteorological parameters may be measured and transmitted using gauges/indicators known in the art and in some embodiments—measuring units usable in stationary climate/weather stations. For example, thermometers (dry and wet), humidity, air pressure and the like. For some meteorological phenomena, other measuring/detecting/reporting devices may be used. For example, one or more meteorological phenomena may be detected, measured (or otherwise evaluated), recorded and transmitted using meteorological sensors (providing indication of humidity, temperature, pressure, wind speed and direction, etc.) with visual systems that using the right optical and electrical hardware and proper software/firmware. For example, the meteorological sensors sense cold temperature, low humidity and a high pressure which may indicate a cold weather forecasting. In addition, optical system adapted to capture consecutive frames of the vicinity of a mobile vehicle, may be used to detect and measure or evaluate meteorological phenomenon such as falling snow. Snow may be detected and measured using image processing in the respective wavelength ranges, that will provide both the amount/density of snow, size of snow particles, temperature of the snow particles and optionally visibility conditions.

In accordance with some embodiments of the present invention, mobile meteorological stations (MMS) may be adapted to be located, affixed, installed and the like on one from a large variety of mobile vehicles, such as trains, overhead electrical trains, trucks, pickup trucks and even cars. The MMS unit may be in active communication with or connected via transmission channel allowing transmission of the measured meteorological conditions or parameters to remote stations. The MMS unit may further be in active communication with geo-location unit, such as global positioning system (GPS) receiver, that may provide geographical data associated with the MMS, to be associated with received meteorological data so as to form geo-meteorological database (GMDB). In some embodiments the GMDB may further be marked with timestamp to build a time-dependent GMDB (TGMDB) that may be used for, for example, forming, optionally with plurality of additional TGMDBs, a dynamic detailed and accurate meteorological map that covers large areas and provides dynamically updated MDB. The transmitted TGMDBs may be collected by a central service, and/or may be available to plurality of users received directly or via intermediate stations. In embodiments where central service is employed, the collected data received from the various TGMDBs may be used to form plurality of layers of meteorological data items and/or meteorological phenomenon, thereby allowing end users to present the required meteorological-related information in the way suiting their needs. The outcome is a geo-temporal (location and time dependent) mesh of nodes each providing at least one type of meteorological data. According to some embodiments based on a plurality of meteorological data items associated with a plurality of geo-nodes in the mesh it may be possible to provide a map of the gradient (differential) of the respective meteorological data item as it changes in time and position.

When taking into consideration the direction of progress of the MMS and temporal component, respective attenuation or amplification of the temporal measured phenomena may be taken in account.

Typically, the level of required resolution of reported meteorological information, both geographical resolution and time-stamp resolution, is directly related to the level of crowdedness/density of human population and accordingly, directly related to the number of travelling vehicles per area unit per time unit. Therefore, according to some embodiments of the invention, the higher is the population density, the higher is the quality of provided dynamic meteorological data.

In addition to sensors known in the art for providing meteorological data, long range vision system (LRVS) may be used. The LRVS may be adapted to acquire images (still and/or video) in various wave lengths, e.g. IR wavelength in the MW and the LW wavelength, preferably in the LWIR (specifically, wavelength at the 8-12 micro-meter range) wavelength range. The LRVS may be equipped with a lens or optical set of lenses having specific performance. Such LRVS may be adapted to extract further meteorological information from the acquired image(s) for example air thru-visibility, level of haziness, snowing conditions, rain conditions and even types and ceiling level of low clouds.

Figure 1:
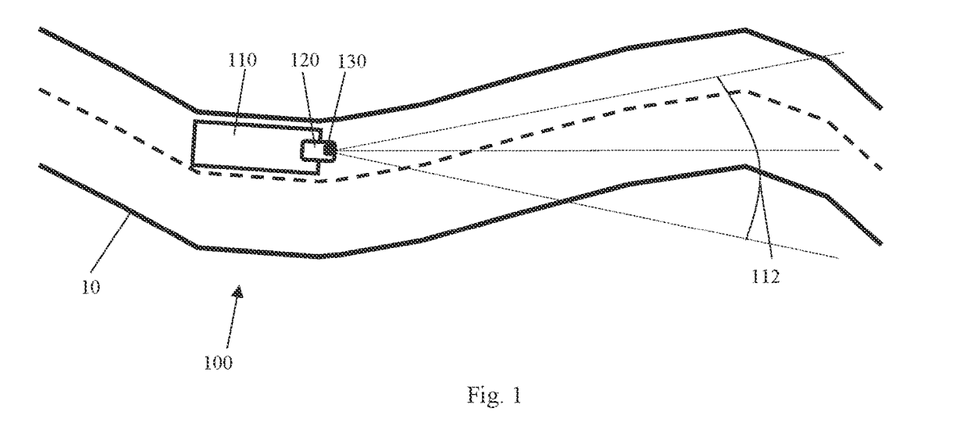
FIG. 1 is a schematic illustration of a mobile meteorological stations (MMS) system for collecting and analyzing meteorological data, according to some embodiments of the present invention.

Reference is made to FIG. 1, which is a schematic illustration of mobile meteorological stations (MMS) system 120 for collecting and analyzing meteorological data, according to embodiments of the present invention. System 120 may be disposed or installed on a traveling vehicle 110 such as a train, a truck, ship, and the like. Traveling vehicle 110 may be capable of traveling along a pre-prepared travel lane (or track) 10, such as a railway or road. MMS system 120 may comprise a long-range vision system (LRVS) 130 adapted to collect/acquire images from a field of view 112, for example extending at the front (the leading edge) of vehicle 110 and looking forward at a viewing angle 112. The pitch opening of the viewing angle (its opening in the vertical dimension of the drawing) may be designed to meet specific design requirements, for example substantially equal to angle 112.

LRVS 130 may be adapted to acquire images in one or more of a plurality of possible wave lengths such as VIS, IR wavelength in the MW and the LW wavelength, preferably in the LWIR (specifically, wavelength at the 8-12 micro-meter range) wavelength range as a reference due to its relative stable visual image, equipped with a lens or optical set of lenses having specific performance. Meteorological phenomena may comprise high relative humidity and/or dust or haze which may limit visibility, or low ceiling clouds, or heavy rain and other phenomena which influence the visibility (reduces it). Each of the above mentioned meteorological phenomena may have different spectral absorption characteristics, expressed in the wavelength dimension, in the magnitude dimension or in both. For example, the attenuation of MWIR visibility through air with 96% relative humidity is about 20 dB compared with that of air with 10% relative humidity or less. With certain particles having attenuating effect on air visibility, such as vapor, fog, dust and so on, the scattering of spectral lines of a given type of particles in a given wavelength may be the same or very close to that of another type of particles such as Mie scattering that is proportional to $1/\lambda$ but may substantially differ in different range of wavelengths such as Rayleigh scattering that is proportional to $1/\lambda^4$.

Accordingly, it is possible to measure large number of different meteorological measurements (temperature, wind speed, humidity, air pressure) at a given location having location coordinates x, y, z, t at any desired location and time along the travel line on each place where vehicle 110 travels with MMS system 120, within the angle of vision 112. The system is able to measure the temporal values representing the various meteorological features and the variance along a certain distance extending from MMS system 120 outwardly along the center of vision beam 120 dynamically. The collected, analyzed and transmitted values may be distributed to distribution clients and may further be used to draw an on-going updating meteorological map, thereby a much more detailed map with a visual image on each place may be provided for a better understanding of the weather condition on site on real time. The collected meteorological information may be distributed from each traveling vehicle 110 to a client every predetermined time delays, e.g., every 1 sec. or less according to needs.

Figure 2:
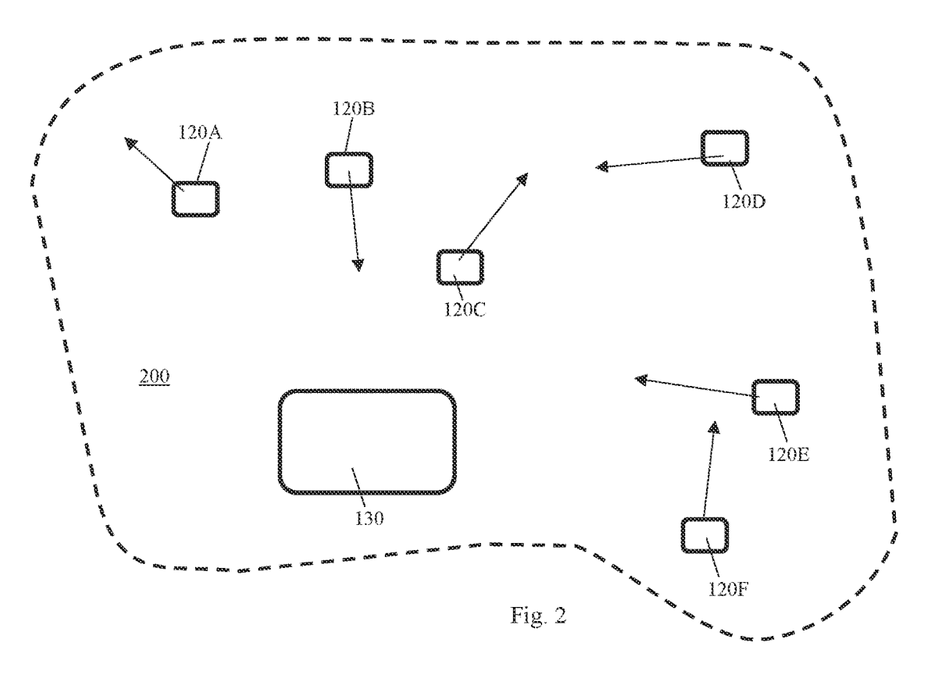
FIG. 2 is schematic illustration of a geographical area in which plurality of MMS units travel and provide time-dependent geo-meteorological database (TGMDB), according to some embodiments of the present invention.

Reference is made now to FIG. 2, which is schematic illustration of geographical area 200 in which plurality of MMS units travel and provide TGMDB, according to some embodiments of the present invention. In an area of interest 200, a plurality of MMS units 120A-120F may travel, each along its travel lane, which may be a road, railway, river and even airline track. Each of MMS units 120A-120F travels, at the time the drawing captures, in its track the direction indicated by the respective arrow. Each of MMS units 120A-120F may be identical or similar to MMS unit 120 of FIG. 1. Accordingly, each of MMS units 120A-120F may collect, record and transmit meteorological data representative of a certain area nearby or surrounding the respective MMS unit. Further, one or more of MMS units 120A-120F may transmit the collected meteorological data either directly to other unit(s) or to a remote central service 130. Remote central service 130 may receive store and process the meteorological data and build, for example by fusing, an enhanced and reach meteorological coverage of the area covered by the plurality of MMS units. That fused meteorological data (FMD) may then be transmitted to meteorological data users, either those having the MMS units installed in their vehicle or others. Images look scattered Reference is made now to FIG. 3, which is a schematic block diagram of MMS unit 300, structured and operative according to some embodiments of the present invention. MMS unit 300 may be similar or identical to MMS units 120, 120A-120F of FIGS. 1 and 2. MMS unit 300 may comprise controller 310 in active communication with meteorological sensors unit 320, with long-range vision system (LRVS) 330, with location unit 340 and with communication unit 350. Controller 310 may be any suitable computer, control unit, programmable controller and the like, that may be adapted to store programs and data and to execute the stored programs according to a desired operation mode.

Figure 3:
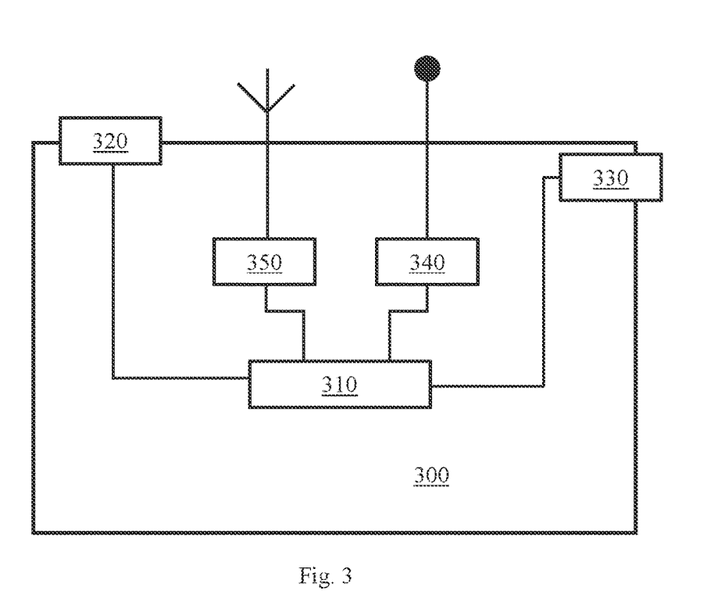
FIG. 3 is a schematic block diagram of a MMS unit, structured and operative according to some embodiments of the present invention.

Controller unit 310 may receive meteorological data from meteorological sensors unit 320, in a digital or analog form, representative of one or more meteorological variables, such as ambient temperature, local air pressure, wind speed and direction, and the like.

Controller unit 310 may receive further meteorological data from LRVS 330. That data may represent meteorological information extractable from still and/or video frames captured, analyzed and provided by LRVS 330 to controller 310.

Controller unit 310 may receive also location data and optionally time-stamps from geo-location unit 140. Geo-location unit 140 may be, for example, a GPS receiver.

MMS unit may optionally communicate with other units and/or with a central service via communication unit 340 that may be in active communication with controller 310.

Figure 4:
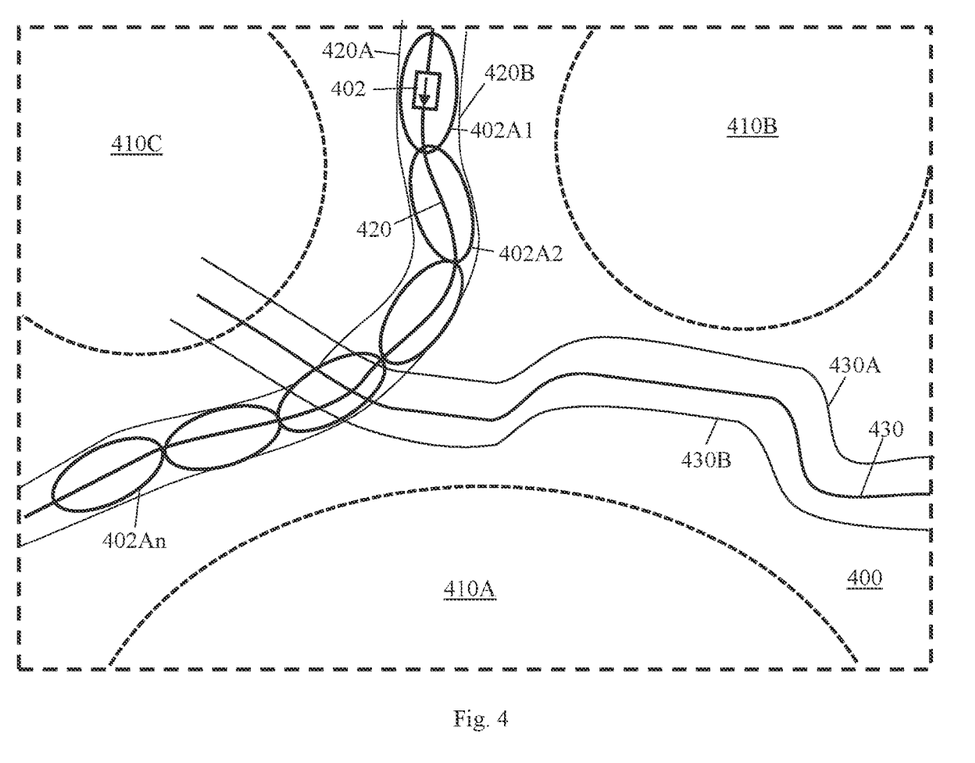
FIG. 4 is a schematic illustration of a region of interest 400 depicting enhanced meteorological data coverage, according to some embodiments of the present invention.

Reference is made now to FIG. 4, which is a schematic illustration of a region of interest 400 depicting enhanced meteorological data coverage, according to some embodiments of the present invention. Region 400 may be crossed by one or more travel lanes 420, 430 representing optional travel lanes such as roads, train rails etc. vehicle with MMS unit 402 may travel along travel lane 420. The area around MMS unit 402 for which MMS unit 402 may provide meteorological information is circled by closed line 402A1. It will be appreciated that, as MMS unit 402 travels along lane 420 in the direction of the arrow, its meteorological coverage area (herein MCA) travels with it, thereby along time consecutive coverage areas 402A2-402An may be monitored, may have meteorological data collected with respect to them and may have that data transmitted outwardly. As seen in the drawing, the travel of MMS unit 402 along lane 420 draws accumulated coverage track defined between lines 420A and 420B. As a result, for the time during which MMS unit 402 travels along lane 420, enhanced meteorological coverage is provided for the area between lines 420A and 420B. Assuming that partial circles 410A-410C represent areas the meteorological data for them is measured, monitored and transmitted by stationary meteorological stations, it is apparent that the addition of meteorological information provided by traveling MMS unit 402 is significant. If additional travelling lanes, e.g., travel lane 430, are crossing area 400, with their respective meteorological coverage lane defined between lines 430A and 430B, it is apparent that the contribution of MMS units for providing updated and high geo-resolution meteorological data may be, in geographical areas with high population density and high density of travel lanes, very significant.

Figure 4A:
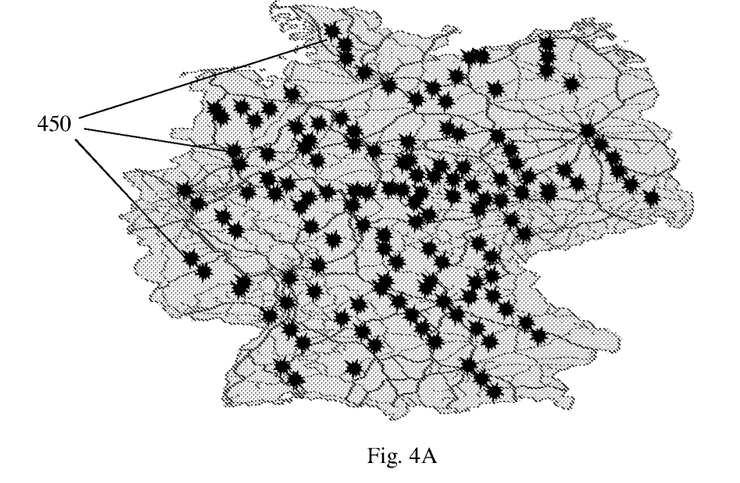
FIGS. 4A, 4B and 4C illustrate a schematic geographical area with coverage of stationary meteorological stations, coverage of the area by plurality of moveable MMS units at a first time and coverage of that area by the plurality of moveable MMS units at a second time, respectively, according to some embodiments of the present invention.
Figure 4B:
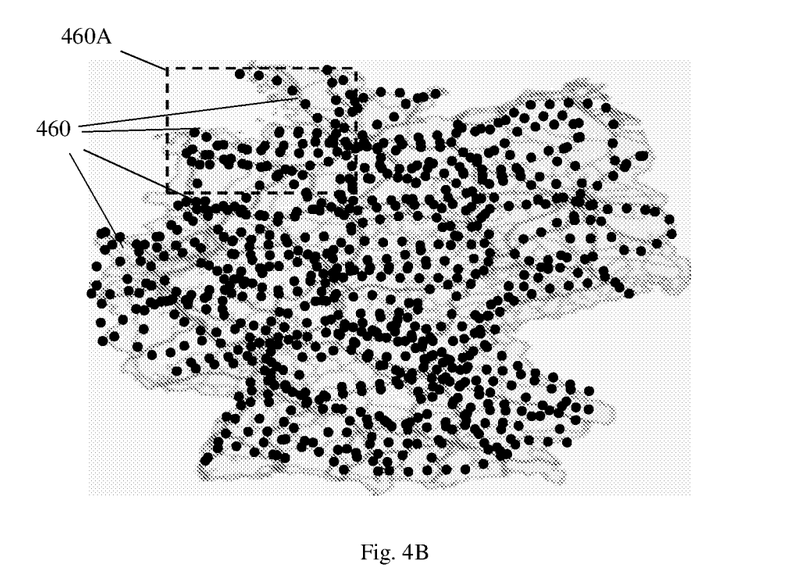
Figure 4C:
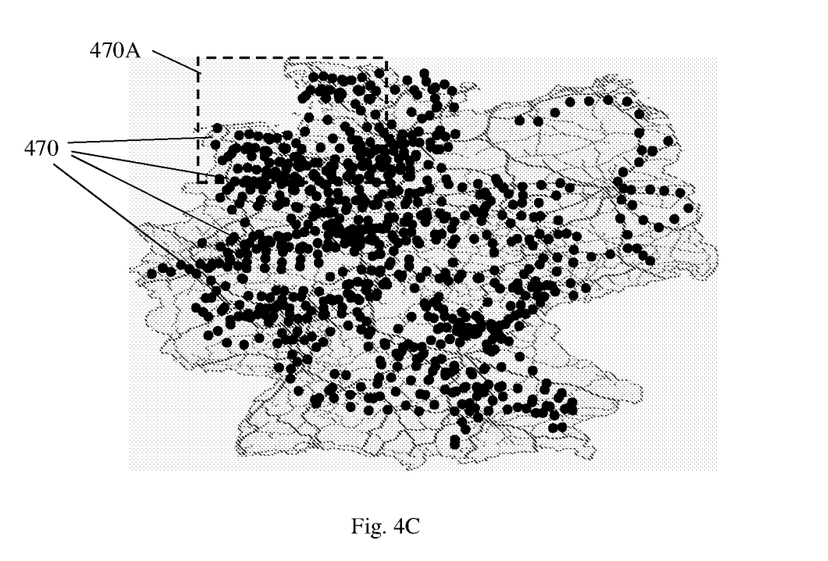

Reference is made now to FIGS. 4A, 4b and 4C which illustrate a schematic geographical area with coverage of stationary meteorological stations 450, coverage of the area by plurality of moveable MMS units 460 at a first time and coverage of that area by the plurality of moveable MMS units 470 at a second time, respectively, according to some embodiments of the present invention. MMS units 460 and 470 may be disposed on moveable vehicles such as trains, trucks, buses, maritime vessels, and the like. As may be seen from these drawings, the coverage provided by the MMS units is denser, compared with that of the stationary units, and, as seen in FIG. 4C, the coverage is dynamic (at least some of the MMS units have changed their location with respect to the location depicted in FIG. 4B), thus as time passes locations that were not covered earlier may now be covered, thereby providing improved and time-dynamic area coverage. For example, the momentary density of MMS units 460 included in sub-area 460A is very low compared with that of momentary density of MMS units 470 included in sub-area 470A encircling the same geographical area as sub-area 460A, at aa different time.

Figure 5:
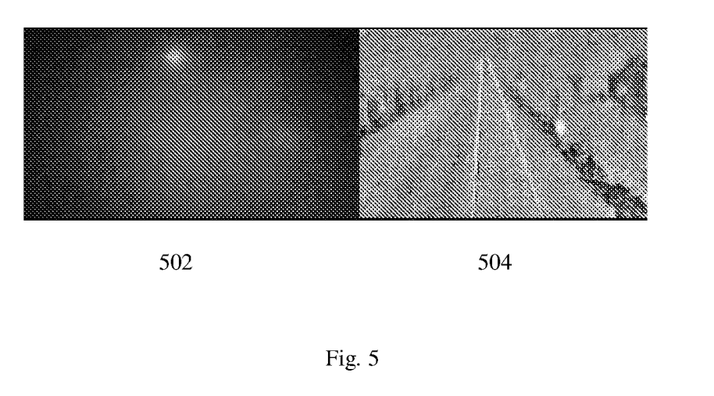
FIG. 5 shows a view of a foggy scene as obtained by an optical sensor operative in the visible range and a view of the same foggy scene as obtained by an optical sensor operative in the LWIR range, according to some embodiments of the present invention. In other or additional embodiments the optical sensor may be operative in the mid-wave IR (MWIR) wavelength range or in the visible light range. According to yet some embodiments the optical sensor may be operative in two or more wavelength ranges.

Depending on the meteorological phenomena, a sensor with the adequate sensitivity may be selected for providing indication of the specific phenomena. For example, in foggy weather optical sensor operative in the visible range may not be adapted to provide visual details, yet an optical sensor operative in the LWIR range may provide rather visible view through the fog. Reference is made now to FIG. 5, which shows a view of a foggy scene as obtained by an optical sensor 502 operative in the visible range and a view of the same foggy scene as obtained by an optical sensor 504 operative in the LWIR range, according to some embodiments of the present invention. As clearly seen, image taken by sensor 504 depicts plurality of details while that taken by sensor 502 is completely dark While certain features of the invention have been illustrated, and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for collecting and distributing meteorological data comprising:
   at least two mobile meteorological stations (MMS), each installed on a vehicle traveling along a pre-prepared travel lane and comprising at least:
   a controller;
   sensors unit to obtain meteorological data, the sensors unit comprising one or more sensors from the list including temperature sensor, humidity sensor, air pressure sensor, wind speed and/or wind direction sensor;
   a location sensor unit to obtain location data;
   a long-range vision system (LRVS) unit configured to acquire images in the vicinity of the MMS in a long wavelength infrared (LWIR) range and process the images to extract meteorological data comprising a relative humidity from the images; and
   a communication unit configured to enable communication with at least one other MMS;
   wherein the controller is configured to:
   receive the meteorological data from the LRVS unit,
   receive the meteorological data from the sensors unit,
   receive the location data from the location sensor unit, and
   send the received meteorological data and the location data to the at least one other MMS; and
   a remote central service unit configured to:
   receive, store and process the meteorological data and the location data from the at least two MMSs; and
   build a dynamic and location-based meteorological data map for an area covered by the at least two MMS units along the pre-prepared travel lane based on the meteorological data and the location data from the at least two MMSs.

2. The system of claim 1, wherein the LRVS is further operative in at least one of a mid-wave IR (MWIR) range and a visible range.

3. The system of claim 1, wherein the LRVS unit is configured to acquire images in a wavelength at 8-12 micrometer range.

4. The system of claim 1, wherein the LRVS unit is configured to process the images to extract the meteorological data comprising an air thru-visibility.

5. The system of claim 1, wherein the LRVS unit is configured to process the images to extract the meteorological data comprising a level of haziness.

6. The system of claim 1, wherein the LRVS unit is configured to process the images to extract the meteorological data comprising a type and a ceiling level of low clouds.

7. The system of claim 1, wherein the LRVS unit is configured to process the images to extract the meteorological data comprising snowing conditions.

8. The system of claim 1, wherein the LRVS unit is configured to process the images to extract the meteorological data comprising rain conditions.

9. The system of claim 1, wherein the LRVS unit is adapted to acquire the images from a field of view extending at a leading edge of the vehicle travelling along the pre-prepared travel lane and looking forward at a viewing angle, and to process the images to dynamically extract temporal values and a variance of the temporal values of the meteorological data along a certain distance extending from the respective MMS outwardly along a center of the viewing angle of the field of view.

10. A method for collecting distributing and presenting meteorological data comprising:
    providing at least two mobile meteorological stations (MMS), each installed on a vehicle traveling along a pre-prepared travel lane and comprising at least:
    a controller;
    sensors unit to obtain meteorological data, the sensors unit comprising one or more sensors from the list including temperature sensor, humidity sensor, air pressure sensor, wind speed and/or wind direction sensor;
    a location sensor unit to obtain location data;
    a long-range vision system (LRVS) unit configured to acquire images in the vicinity of the MMS in a long wavelength infrared (LWIR) range and process the images to extract meteorological data comprising a relative humidity from the images; and
    a communication unit configured to enable communication with at least one other MMS;
    collecting the meteorological data and the location data from at least one of the at least two MMSs;
    sending the collected meteorological and the location data to the at least one other MMS; and
    sending the collected meteorological and the location data of the at least two MMSs to a central service unit; and
    building a dynamic and location-based meteorological data map for an area covered by the at least two MMSs along the pre-prepared travel lane based on the collected meteorological and the location data.

11. The method of claim 10, wherein the LRVS is further operated in at least one of a mid-wave IR (MWIR) range and a visible range.

12. The method of claim 10 wherein the dynamic and location-based meteorological data map comprises indication of the gradient of one meteorological data item as the meteorological data item changes in time and position.

13. The method of claim 10, wherein the LRVS unit is configured to acquire images in a wavelength at 8-12 micrometer range.

14. The method of claim 10, wherein the LRVS unit is configured to process the images to extract the meteorological data comprising an air thru-visibility.

15. The method of claim 10, wherein the LRVS unit is configured to process the images to extract the meteorological data comprising a level of haziness.

16. The method of claim 10, wherein the LRVS unit is configured to process the images to extract the meteorological data comprising a type and a ceiling level of low clouds.

17. The method of claim 10, wherein the LRVS unit is configured to process the images to extract the meteorological data comprising at least one of snowing conditions and rain conditions.

18. The method of claim 10, wherein the LRVS unit is adapted to acquire the images from a field of view extending at a leading edge of the vehicle travelling along the pre-prepared travel lane and looking forward at a viewing angle, and to process the images to dynamically extract temporal values and a variance of the temporal values of the meteorological data along a certain distance extending from the respective MMS outwardly along a center of the viewing angle of the field of view.

* * * * *